Feb. 24, 1959 A. L. CAVALIERI, JR., ET AL 2,875,353
ELECTROMECHANICAL REED SYSTEM
Filed May 29, 1953
3 Sheets-Sheet 1

INVENTORS
ALBERT L. CAVALIERI, JR.
ROBERT W. ROOP
BY
Brown, Penk & Synnestvedt
AGENTS Feb. 24, 1959  A. L. CAVALIERI, JR., ET AL  2,875,353
ELECTROMECHANICAL REED SYSTEM
Filed May 29, 1953  3 Sheets-Sheet 2

INVENTORS
ALBERT L. CAVALIERI, JR.
ROBERT W. ROOP
BY
Brown, Jenks & Lynnestvedt
AGENTS Feb. 24, 1959  A. L. CAVALIERI, JR., ET AL  2,875,353
ELECTROMECHANICAL REED SYSTEM
Filed May 29, 1953
3 Sheets-Sheet 3

INVENTORS
ALBERT L. CAVALIERI, JR.
ROBERT W. ROOP
BY
Brown, Jenks & Lynnestvedt
AGENTS United States Patent Office 2,875,353
Patented Feb. 24, 1959

2,875,353

ELECTROMECHANICAL REED SYSTEM

Albert L. Cavalieri, Jr., Philadelphia, Pa., and Robert W. Roop, Sewell, N. J., assignors to Philco Corporation, Philadelphia, Pa., a corporation of Pennsylvania Application May 29, 1953, Serial No. 358,286

4 Claims. (Cl. 310—8.2)

This invention relates to frequency sensitive electromechanical systems, and more particularly to electromechanical systems employing a vibratory reed as the frequency sensitive element.

It is well known that a reed comprising an elongated strip of elastic material rigidly supported at one end may be caused to vibrate by the application thereto of a periodic excitation having a frequency in the vicinity of the natural resonant frequency of the reed. The amplitude of the vibration, that is the maximum displacement of the free end of the reed measured from the rest position, is a function of many variables including the constants of the reed, the amplitude of the exciting signal and the difference between the frequency of the exciting signal and the natural frequency of the reed.

One relationship between the amplitude of vibration of the reed and the frequency of the exciting signal is known as the bandwidth of a reed. The bandwith of a reed is defined as the frequency interval between the exciting frequency below the resonant frequency of the reed and the exciting frequency above the resonant frequency of the reed, both of which cause an amplitude of vibration equal to .707 times the amplitude of vibration caused by an exciting signal of the same amplitude having a frequency equal to the resonant frequency of the reed. It will be recognized that the term "bandwidth," as applied to a reed, has a meaning closely analogous to that of the term "bandwidth" as applied to a resonant resistor-inductor-capacitor circuit. It is also known that, by proper choice of material and dimensions, reeds may be constructed which have a bandwith that is very small compared to the resonant frequency. The quality factor or Q is the ratio of the energy stored in the vibrating reed system to the energy dissipated per cycle, and is very nearly equal to the ratio of the resonant frequency to the bandwidth for a reed having a high Q. By way of example, it is an easy matter to construct a vibrating reed having a resonant frequency of the order of 250 cycles per second and a bandwith of a small fraction of one cycle per second.

Frequency meters are now commercially available which employ a bank of high Q reeds, each tuned to a slightly different resonant frequency. The reeds are energized by forming them of a magnetic material and applying the periodic signal to be measured to an electromagnet spaced some distance from the reed bank. The frequency is determined by observing the reeds and noting visually which reed is vibrating with the greatest amplitude. This and other similar vibratory reed systems known to the prior art are subject to several serious disadvantages. The magnetic drive systems, and other drive systems known in the art, are inefficient and difficult to control and are seriously affected by changes in operating temperature, humidity, etc. A second disadvantage is that the output of most prior art reed systems is in the form of a visual indication which cannot be utilized to control an electrical circuit. In certain prior art reed systems, contact points are provided which contact the reed if the amplitude of vibration thereof exceeds a preselected value. Such contact points are difficult to adjust, they provide only a limited amount of output information, and they interfere with the natural vibration of the reed. Attempts have been made to obtain a measurement of the amplitude of vibration by measuring the variation in the capacitance between the free end of the reed and the stationary plate. Such a system is utterly impractical if several reeds of small size are to be mounted within a small volume. These and other disadvantages have limited the usefulness of the vibrating reed type of electromechanical systems.

Therefore it is an object of the present invention to provide a new and improved type of vibrating reed structure.

It is a further object of the invention to provide an improved reed structure in which the input and/or the output are in the form of electrical signals.

It is a further object of the invention to provide a novel electromechanical filter network having an input and/or output in the form of an electrical signal.

It is a further object of the invention to provide a family of frequency sensitive electromechanical systems having an input and/or output in the form of an electrical signal, and in which the frequency sensitive element comprises a vibrating reed.

These and other objects of the invention are accomplished through the use of a vibratory reed structure having a piece of piezoelectric material secured thereto adjacent the fixed end thereof so as to be strained by the vibration of the reed element. The energizing signal is supplied to, or the output signal is obtained from, electrodes suitably positioned on the piezoelectric material. In certain preferred embodiments of the invention a plurality of piezoelectric members are employed which are mechanically coupled to one another through the vibratory reed element. The reed elements may be employed either singly or in matched pairs with mechanical coupling therebetween, and the individual reed elements or reed element pairs may be assembled in banks.

For a better understanding of the invention together with other and further objects thereof reference should now be made to the following detailed description which is to be read in connection with the accompanying drawing in which.

Figure 1:
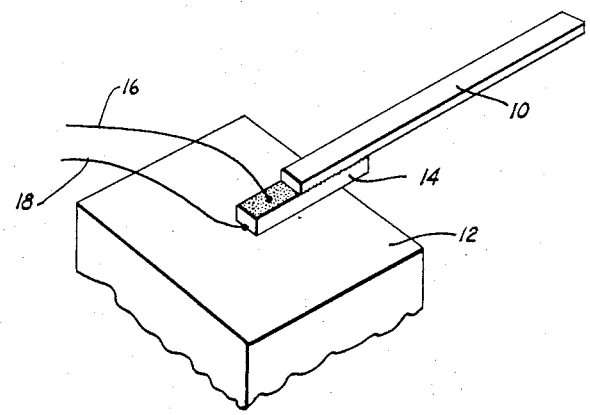
Fig. 1 is an isometric view of one embodiment of the present invention.

The embodiment of the invention shown in Fig. 1 comprises an elongated reed element 10 which is arranged to vibrate in a vertical plane when positioned as shown in Fig. 1. Reed element 10 is supported on a relatively massive base 12 by means of a block of piezoelectric material 14. The function of member 12 is to provide driving energy for, or to obtain an output signal from, reed element 10 in a manner presently to be described. Reed element 10 may be formed of any material having a relatively high modulus of elasticity and relatively low internal losses. The length, thickness, and stiffness of the material should be selected in accordance with conventional engineering practice to give the desired resonant frequency. The width of the reed in a direction at right angles to the plane of motion has very little effect on the resonant frequency. In certain embodiments of the invention it is desirable to drive the reed element 10 with a conventional electromagnetic drive system. In such embodiments the reed element 10 must be made of some magnetic material such as steel. In other embodiments of the invention, new and improved means for driving reed element 10 are employed which do not involve any magnetic effect so that much greater freedom is permitted in the choice of material for reed element 10. It is sometimes advantageous, for reasons that will appear presently, to form reed element 10 of a non-conducting material such as glass.

Member 14 is formed of a piezoelectric material which exhibits the property of changing dimension when a charge is induced on two opposite faces thereof and, conversely, of causing a charge to appear on the two faces when the block is forced to change in dimension (i. e. is strained) in response to an externally applied stress. Barium titanate and Rochelle salt are two materials known to exhibit such a piezoelectric effect. Barium titanate is suggested as a preferred choice of material in most instances. Barium titanate is made to exhibit the piezoelectric effect by first forming the material in the desired shape, for example in the shape of piezoelectric member 14, applying suitable electrodes to two faces of the block, polarizing the barium titanate by applying a D.-C. voltage to the two electrodes while the block is held at a temperature above the Curie point of the material, and then allowing the material to cool below the Curie point before removal of the polarizing potential. The piezoelectric effect is believed to be due to the fact that barium titanate, above about 120° C., has a cubic structure with 8 barium atoms at the corners of the cube, 6 oxygen atoms at the face centers of the cube and one titanium atom at the center of the cube. Below 120° C. the titanium atom moves from the center to a position adjacent one oxygen atom. The crystal then becomes tetragonal with the axis in the direction of the titanium motion 1% longer than the other axes. For an unpolarized polycrystalline material, all domains are equally distributed in all directions and no residual polarization occurs. By applying the D.-C. polarizing field with the temperature above the Curie point and then allowing the material to cool, more titanium atoms are caused to line up with oxygen atoms along an axis parallel to the applied D.-C. field. When the field is removed, the line-up remains resulting in a residual polarization of the material. Addition of a small amount of lead titanate has been found to increase the ability of barium titanate to retain this polarization. When a potential is then applied to the material which is too small to reverse any complete domain, the following effect results. The applied potential causes molecules on the common plane of differently directed domains to change from one domain to another, hence causing one domain to grow at the expense of other domains. If the applied field is opposed to the residual polarization, some domains directed along the axis of polarization will be lost to other domains directed in different directions and the block will become thinner. If the applied potential reinforces the residual polarization, more molecules will have their titanium atoms lined up with oxygen atoms along the axis of polarization and the block will become thicker. This explanation has been included solely for the purpose of aiding the reader in understanding the operation of the present invention and it should not be construed so as to impose any limitation whatsoever on the present invention.

In the embodiment shown in Fig. 1, suitable electrodes, such as fired platinum, are applied to the upper and lower faces of member 14 and member 14 is polarized along an axis joining these two faces. Member 14 may be secured to reed element 10 in any suitable fashion. One preferred method comprises bonding the two elements together with a thermosetting bonding material which is characterized by having low shrinkage during curing. Araldite Powder, manufactured by the Ciba Company, is a suitable example. In constructing the embodiment shown in Fig. 1 it may be desirable to polarize member 14 after assembly since the heat necessary to fire the electrodes and to bond member 14 and element 10 might cause depolarization of member 14.

The dimensions of member 14 are not critical but certain factors affecting the choice of dimensions should be considered. The width of member 14, in a direction at right angles to the plane of motion of reed element 10, may be chosen to be equal to the width of reed element 10 for convenience in construction. The coextensive portions of member 14 and reed element 10 form a composite beam which is flexed by the vibration of reed element 10. Since the operation of the present invention depends upon the generation of a charge between the upper and lower faces of member 14 by the application of a compressive or a tensive stress in the direction of the longer axis of member 14, it is desirable to choose the thickness of member 14, measured in the plane of motion of reed element 10, so that the neutral axis of the composite beam will lie substantially along the boundary between member 14 and reed element 10. If the thickness dimension is chosen in this manner, an upward deflection of the free end of reed element 10 places member 14 wholly in tension parallel to its longer horizontal dimension, and a downward deflection of the free end of reed element 10 places member 14 wholly in compression parallel to this dimension. If the neutral axis lies at some position below the boundary between member 14 and reed element 10, member 14 will be partially in tension and partially in compression in a direction parallel to the longer dimension of member 14 and a slightly lower efficiency of the system will result. If the neutral axis lies above the boundary, part of the tensile or compressive stress will be taken up by reed element 10 which will also result in a lower efficiency of the system. The limitation discussed above requires that the titanate have a thickness of the order of 1.5 to 3 times the thickness of a steel reed.

One point should be clarified before describing other factors affecting the choice of dimensions of member 14. In describing the piezoelectric effect it was stated that elongation and contraction of the material should take place along the axis of polarization in order to produce an output signal. This would appear to require that the electrodes be placed on the vertical faces of member 14 in Fig. 1, and that the block be polarized parallel to its longer dimension. This is not desirable for the reason that the spacing between the electrodes would be so great, and the area so small, that the internal impedance would be so high that it would be difficult to measure any charge appearing on the electrodes, and further, because of the high internal impedance, it would be difficult to supply a signal to these electrodes which would cause reed element 10 to vibrate. Therefore, use is made of another characteristic of an elastic material to overcome this difficulty. It is known that, if a block of elastic material is elongated in one direction by the application of an external stress, the dimensions of the block at right angles to the elongation will decrease in an attempt to keep the volume of the block constant. The ratio of the elongation of the block in one direction to the shortening of the block in a perpendicular direction is expressed by Poisson's ratio which is equal to approximately 0.27 for barium titanate. Therefore it is possible to place the electrodes on the upper and lower faces of member 14 and to polarize this block along a line joining these faces and obtain a much lower internal impedance. The much lower internal impedance more than compensates for the smaller dimensional change in this direction.

The straining of member 14 occurs mainly in the region overhanging base 12. (Here and throughout the specification and claims the term "strain" is used in its technical sense to mean a deformation or distortion due to stress or force.) Therefore, the length of this overhang should be chosen with the following considerations in mind. A long overhang will add to the stiffness of the reed, and hence raise the resonant frequency. This may be compensated for in the selection of dimensions for reed element 10. The amplitude of the output signal depends upon the amount of the piezoelectric material that is strained, so that a longer overhang will generally give a larger output signal. If member 14 is to be employed to drive reed element 10 rather than to extract a signal therefrom, a longer overhang will result in a greater driving force applied to reed element 10 for a given amplitude of driving signal. The length of the overhang may have some effect on the Q of the reed system also. It is difficult to state even approximate dimensions that will apply under all situations, but an overhang of the order of 0.1 to 0.2 times the length of reed element 10 is suggested as a starting point for an empirical determination of the optimum length of overhang. The total length of boundary between reed element 10 and member 14, and between member 14 and base 12, should be sufficient to provide adequate bounding areas. The extension of member 14 beyond reed element 10 is mainly for the purpose of providing an area to which a lead wire may be secured. Note that, in the structure shown in Fig. 1, lead wires 16 and 18 are attached to stationary portions of the reed system. In this position the leads have no effect on the vibrations of the system. Base 12 preferably has sufficient mass so that it does not vibrate appreciably in response to vibrations of reed 10.

By way of further explanation, a reed having the following approximate dimensions:

|  | Inches |
|---|---|
| Overall length of reed element 10 | 1.375 |
| Thickness of reed element 10 | 0.013 |
| Width of reed element 10 | 0.060 |
| Overall length of member 14 | 0.5 |
| Thickness of member 14 | 0.035 |
| Overhang of member 14 | 0.25 |
| Extension of member 14 beyond element 10 | 0.125 | was found to have the following characteristics:

Output voltage for 0.04" peak-to-peak tip displacement:
    10 megohm load _____ volts __ 8
    1 megohm load _____ do ____ 4
Estimated internal impedance _____ megohm __ 1
Resonant frequency _____ C. P. S __ 250
Bandwidth _____ C. P. S __ 1/3

The reed element 10 of Fig. 1 may be caused to vibrate by supplying to member 14, by way of leads 16 and 18, a driving signal having a frequency equal to the mechanical resonant frequency of the reed system including member 14 and reed element 10. The output signal from the system of Fig. 1 would be a visual indication of the amplitude of vibration of reed element 10.

Figure 2:
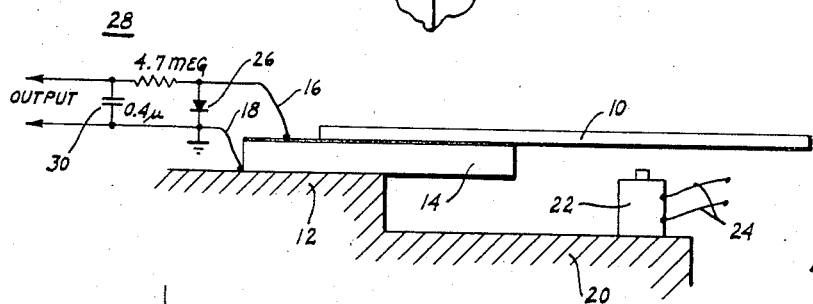
Fig. 2 is a plan view, partly in schematic form, of an electromechanical system incorporating the reed system shown in Fig. 1.

Fig. 2 is a side elevation, partly in schematic form, of an electromechanical system employing the novel reed structure of Fig. 1 and having both an electrical input and an electrical output. Parts in Fig. 2 corresponding to like parts in Fig. 1 have been given the same reference numerals. In the system shown in Fig. 2, reed element 10 and base 12 are formed of a magnetic material such as steel. Base 12 is provided with an extension 20 on which is supported an electromagnet 22. Leads 24 are provided as a means for supplying an energizing signal to electromagnet 22. Electromagnet 22 is a known means for setting reed element 10 into oscillation.

The system shown in Fig. 2 operates in the following manner. A signal, which may have a component having a frequency approximately equal to the resonant frequency of the reed system, is supplied to electromagnet 22 by way of leads 24. This signal causes reed element 10 to vibrate and strain the piezoelectric block 14. As the result of this strain an alternating electrical signal appears between leads 16 and 18. The signal between leads 16 and 18 will have a frequency equal to the resonant frequency of the reed system and an amplitude proportional to the amplitude of the component causing excitation and the frequency displacement of this component from the resonant frequency of the reed system. This signal may be applied as an input signal to any desired form of electronic circuit. The system, from input leads 24 to output leads 16 and 18, is a filter having an extremely narrow passband with very steep skirts. It is the electrical equivalent of a filter composed of $\pi$ or T sections of capacitors and inductors but is much more compact and selective, especially at frequencies in the low audio range. The bandwidth of the filter may be increased by lowering the Q of the reed or by connecting several systems of the type shown in Fig. 1 in parallel. The resonant frequencies in the parallel system would be spaced apart by approximately one bandwidth. All reeds may be excited by the same electromagnet 22. Such a filter is characterized by a flat passband with the same steep skirts as the single element filter. It has been found that the coupling between adjacent reeds in such a parallel combination is very slight even with a very close spacing between reeds. If adjacent reeds have resonant frequencies spaced one bandwidth apart, the response of one reed to the excitation of an adjacent reed can be made to be at least 20 db below the maximum response when excited at its own resonant frequency. If it is desired to obtain a detected output signal instead of the alternating signal mentioned above, a diode element 26, for example a selenium diode type 6GA1-3B, is connected across leads 16 and 18, and the diode shunted with the usual detector load circuit comprising resistor 28 and capacitor 30.

Figure 3:
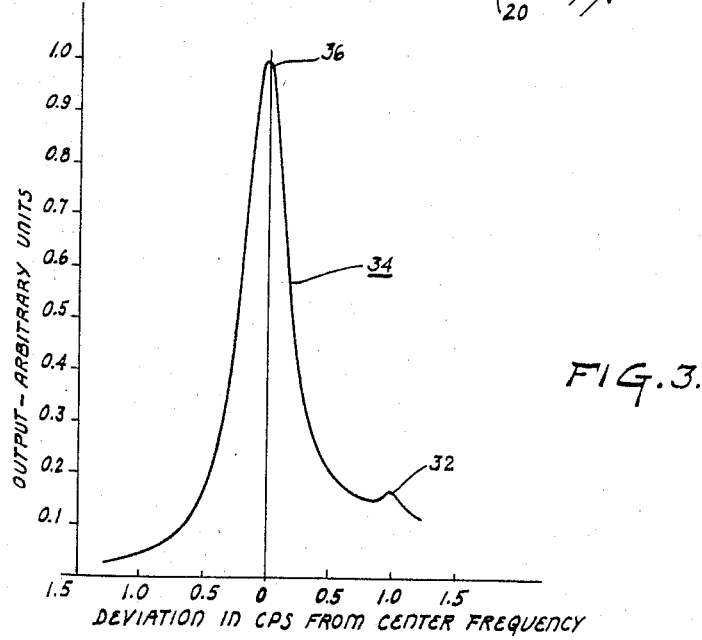
Fig. 3 is a typical response curve of the embodiment of the invention shown in Figs. 1 and 2.

Fig. 3 is a reproduction of an experimental curve of the output of one reed system of the type shown in Fig. 2 as a function of frequency of the driving signal, this reed system being one of a bank of 10 covering the range 245 C. P. S. to 254 C. P. S. in 1 C. P. S. intervals. It will be noted that the secondary response peak 32 in curve 34 of Fig. 3 is well below the main peak 36.

Figure 4:
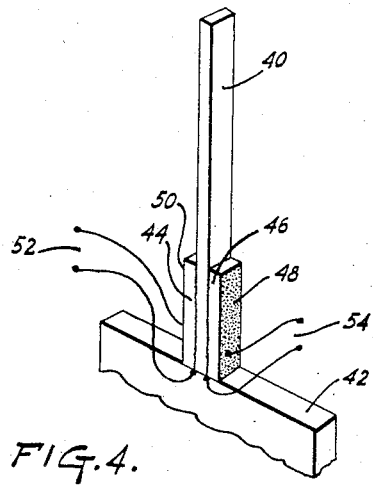
Fig. 4 is a view of a second embodiment of the invention.

Fig. 4 shows still another embodiment of the invention having both an electrical input and an electrical output. The embodiment shown in Fig. 4 does not employ the electromagnetic drive shown in Fig. 2 which experience has shown to be difficult to adjust and not entirely satisfactory. The system shown in Fig. 4 comprises a reed element 40 which is formed integrally with or is rigidly fastened to a base 42. In the embodiment shown in Fig. 4, reed element 40 may be formed of a magnetic or non-magnetic material. Two members 44 and 46, formed of piezoelectric material, are bonded to reed element 40 adjacent the fixed end thereof. The bonding may be accomplished in the manner described above or in any other suitable manner. Members 44 and 46 are provided with conductive area electrodes on the exposed vertical faces 48 and 50. The faces of members 44 and 46 which are in contact with reed element 40 are also provided with conductive area electrodes. If reed element 10 is formed of a conductive material, and members 44 and 46 are in electrical contact therewith (which will be the case if a conductive bonding agent is employed), then reed element 40 will serve as the second area electrode for members 44 and 46. The advantage of employing a nonconductive reed or a conconducting bonding agent is that, in this form of construction, members 44 and 46, which form portions of the input and output circuits respectively, are electrically isolated. Leads 52 are connected to the two conductive electrodes on member 44, and leads 54 are connected to the conductive electrodes on block 46. Members 44 and 46 are polarized in the direction of a line joining the two faces but the polarization of the two members 44 and 46 may be in the same or opposite directions. Certain of the considerations which entered into the choice of dimensions for member 14 of Fig. 1 do not apply to members 44 and 46 of Fig. 4. The neutral axis of the reed structure shown in Fig. 4 lies somewhere within reed element 40 if members 44 and 46 are of approximately equal thickness. It is desirable to form these two members with substantially the same dimensions in order to preserve the symmetry of the vibrating system. Members 44 and 46 are shown as having a rectangular form, but the invention is not to be limited to this particular configuration. In some instances it may be desirable to taper members 44 and 46 and/or reed element 40 to provide a more uniform straining of members 44 and 46. Alternatively, it would be possible to form reed element 40 with an elliptical cross-section and members 44 and 46 with a crescent shaped cross-section. Many other configurations will occur to those skilled in the art of designing reed systems.

The operation of the system shown in Fig. 4 is substantially identical to the operation of the system shown in Fig. 2. An energizing signal is supplied to leads 52. This signal will stress member 44 but no substantial movement of reed element 40 will result unless the energizing signal has a frequency or component which is of a frequency which is substantially equal to the resonant frequency of the reed system. If reed element 40 is not set into vibration, no signal appears between output leads 54. However, if reed element 40 is caused to vibrate, these vibrations will strain member 46 and an output signal will appear between leads 54. The amplitude of this output signal will be a function of the amplitude of the input signal, and the difference in frequency between the frequency of the component causing excitation and the resonant frequency of the reed system. It should be remembered that, in any instance where an applied potential causes a strain in a piezoelectric member, a corresponding strain resulting from an externally applied stress will cause a potential to appear at the points where the potential was formerly applied. Therefore, throughout the specification and claims, any piezoelectric member described as a means for deriving a signal from a reed system may also be employed to supply energy to the reed system.

Figure 5:
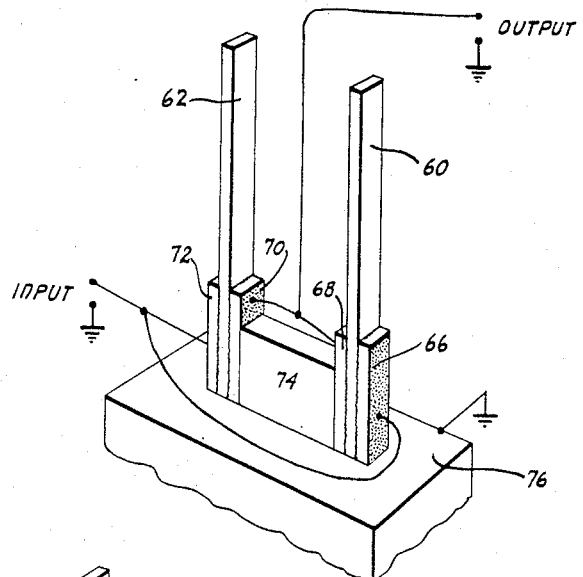
Fig. 5 shows a third embodiment of the invention employing two reed elements in a balanced system.

Fig. 5 illustrates a preferred form of the invention which employs two reed elements 60 and 62 arranged in a balanced system. Reeds 60 and 62 preferably have substantially the same dimensions and identical resonant frequencies. Piezoelectric members 66 and 68 are secured to opposite sides of reed element 60 in the plane of motion of this reed, and piezoelectric members 70 and 72 are secured to opposite sides of reed element 62. Reed elements 60 and 62 are mechanically coupled by a block 74, of material having a high modulus of elasticity, which is disposed therebetween and bonded to piezoelectric blocks 68 and 70. The whole assembly just described is secured to base 76 in any suitable manner. The mechanical coupling afforded by block 74 causes reed elements 60 and 62 to vibrate 180° out of phase like the arms of a tuning fork. Members 68 and 70 have their exposed faces polarized alike so that like charges appear on these faces. Therefore members 68 and 70 may be connected in parallel as shown in Fig. 5. Similarly members 66 and 72 may be connected in parallel as shown. Various modifications of the system shown are possible. The polarization of members 66 and 68 may be reversed and members 66 and 70 and 68 and 72 connected in parallel. Obviously, members 68 and 70 shown in Fig. 5 may be connected to the input terminals of the system and thus serve as the driving members of the system, in which case members 66 and 72 would be connected to the output terminals. In the embodiment shown in Fig. 5, members 66 and 72 may differ in size or shape from members 68 and 70 without destroying the symmetry of the system. This makes it possible to design one pair of piezoelectric members to give maximum efficiency as driving elements, and the other pair to give maximum efficiency as output coupling elements. In an alternative form of the invention, block 74 may be secured directly to, or be formed integrally with, reed elements 60 and 62. In this form of the invention, members 68 and 70 may be secured to reed elements 60 and 62 in a position above block 74. Since reed elements 60 and 62 are mechanically coupled through block 74, one pair of piezoelectric members, for example members 66 and 68, may be omitted. However, this destroys the symmetry of the system and removes many of the advantages of the balanced system. The chief advantages of the balanced system are lower impedance because of the parallel connection of the piezoelectric members, less coupling to base 76 because of the 180° phase difference in the vibrations of reed elements 60 and 62, and reduced shock excitation of reed elements 60 and 62 due to shocks imparted to base 76 from external sources. The reduced shock excitation is due to the fact that any jarring of base 76 excites reed elements 60 and 62 in phase causing equal and opposite signals to appear on the exposed faces of members 68 and 70. The parallel connection of blocks 68 and 70 causes the signal appearing on one block, due to shock excitation, to cancel the corresponding signal on the other block. The lower coupling to base 76 permits a less massive base to be employed and allows systems of the type shown in Fig. 5 to be assembled into banks of closely spaced systems without appreciable mutual coupling therebetween.

Figure 6:
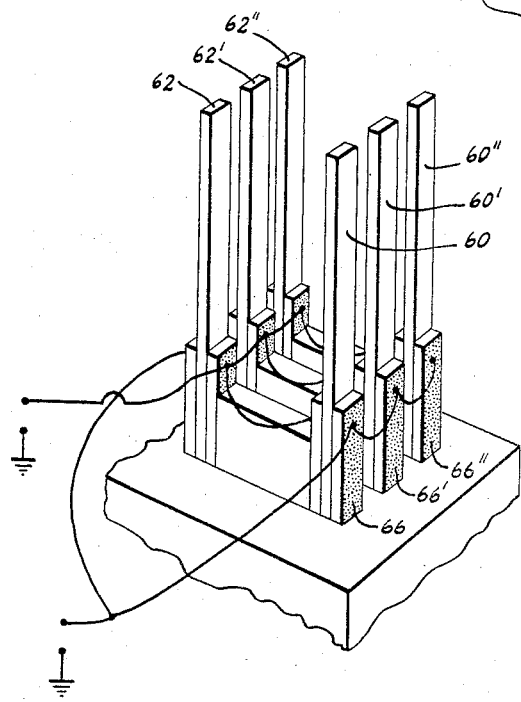
Fig. 6 illustrates an assembly of three reed systems of the type shown in Fig. 5.
Figure 7A:
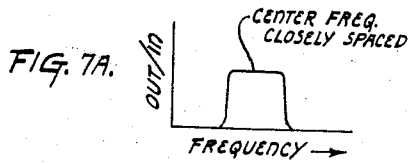
Figs. 7A through 7D are plots showing a few of the many characteristics obtainable with the assembly shown in Fig. 6.
Figure 7B:
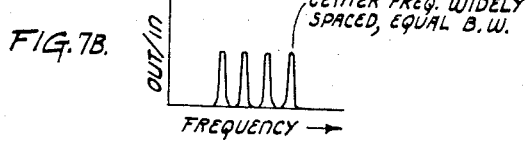
Figure 7C:
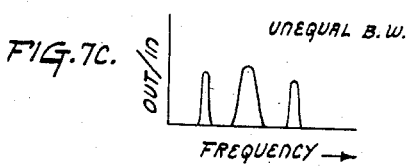
Figure 7D:
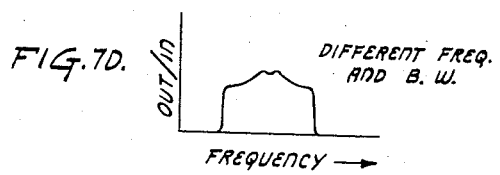

Fig. 6 shows an electromechanical system employing three pairs of reed elements 60—62, 60'—62' and 60''—62''. Each of these pairs may be tuned to the same or to slightly different resonant frequencies. Members 66, 66' and 66'' are shown connected in parallel as are the other piezoelectric members corresponding to members 68, 70 and 72 in Fig. 5. The system shown in Fig. 6 will not be described in detail since the operation thereof is believed to be obvious from the foregoing detailed description of the present invention. One point should be noted, however—namely, that it is not necessary that the output piezoelectric elements be polarized alike or connected in parallel in the manner shown unless it is desired to construct a simple filter having a single flat passband. Furthermore, the reed element pairs in different systems in the bank may have different bandwidths to facilitate shaping of the composite passband.

Figs. 7A through 7D show the passbands which may be obtained by suitable combination of the novel reed systems described above. It should be remembered that the systems having any one of these passbands may have both an electrical input and an electrical output, that the systems are relatively easy and inexpensive to construct and occupy only a very few cubic inches of space even at audio frequencies. Obviously it is impossible to duplicate these results with conventional capacitor-inductor networks or known forms of reed systems.

So far no mention has been made of the limits of frequency operation of the present invention. Again it is both difficult and undesirable to set precise limits since the development of new materials for the reed elements or the piezoelectric members might extend the range of operation beyond present limits. However, it can be safely stated that the reed system shown may be constructed of presently available materials to cover the range from subaudible frequencies to frequencies of the order of several kilocycles per second.

It is impossible to describe within the limits of this specification all of the possible uses of the present invention. However, two novel systems which are described and claimed in our copending application, Serial No. 365,404, filed July 1, 1953, and which make use of the present invention, will serve as typical illustrations.

Figure 8:
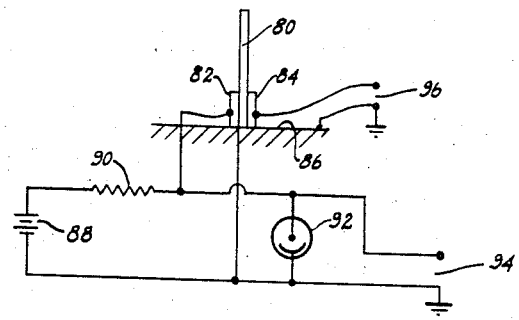
Fig. 8 is a schematic representation of an oscillator-detector system incorporating the present invention.

Fig. 8 is a view, partly in schematic form, of an electromechanical system employing the present invention which may be made to function either as a stabilized oscillator or as a narrow band threshold detector by proper choice of system constants. The system shown in Fig. 8 comprises a reed system of the type shown in Fig. 4 including a reed element 80 and piezoelectric members 82 and 84. The connection to the faces of members 82 and 84 which are in contact with reed 80 are made to conductive base member 86. A source of D.-C. potential 88 is connected through a resistor 90 to the two electrodes on member 82. A gas discharge tube 92 is also connected between the electrodes of member 82. Terminals 94 and 96 provide means for obtaining output signals from and/or applying input signals to the system shown in Fig. 4.

Figure 8A:
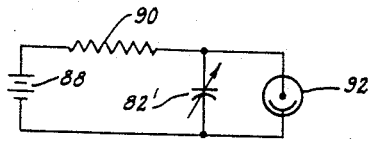
Fig. 8A is a partial equivalent circuit of the system shown in Fig. 8.
Figure 9:
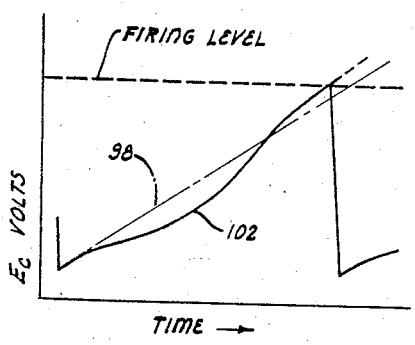
Fig. 9 is a plot of the signals appearing in the system of Fig. 8 when energized as an oscillator.

Fig. 8A is the equivalent circuit of the system of Fig. 8, omitting terminals 94 and 96. Capacitor 82' in Fig. 8A represents the capacitor formed by member 82 and the two electrodes on the faces thereof. Reference should be made also to Fig. 9 which shows the signal relationship existing in the system of Fig. 8 when it is energized as an oscillator. Turning now to the description of the system of Fig. 8 as an oscillator, D.-C. source 88 has an output voltage which is considerably higher than the firing potential of gas discharge tube 92. Capacitor 82' is charged through resistor 90 at an exponential rate until the potential across gas discharge tube 92 reaches the firing level. At this point, tube 92 fires and rapidly discharges capacitor 82'. This rapid discharge stresses member 82 which is the dielectric for capacitor 82'. The sudden change in dimension of member 82, resulting from the sudden change in voltage thereacross, shock excites reed element 80 into oscillation. Condenser 82' now recharges at an average rate represented by line 98 in Fig. 9, but superimposed on this charging potential is an alternating potential 102 resulting from the vibration of reed element 80 straining member 82. This alternating component 102 causes the next and all succeeding cycles to fire tube 92 on a positive half cycle of component 102. Therefore the duration of the sawtooth signal appearing across gas discharge tube 92, and hence across terminals 94, is held at a predetermined number of cycles of the resonant frequency of reed 80 provided the value of R and the potential supplied by source 88 remain reasonably stable. In Fig. 9 the period of the sawtooth wave is equal to one period of the component 102. The period of the sawtooth cycle can be changed in increments equal to the period of component 102 by varying either the applied potential from source 88 or the value of resistor 90. In practice it has been found that the oscillator locks in over an appreciable range of either variable. The system shown in Fig. 8 provides a second output signal at terminals 96 in the form of an alternating voltage at the resonant frequency of the reed system. In a slightly modified form of the invention, it is possible to synchronize the sawtooth signal with an externally generated signal having a frequency equal to the resonant frequency of the reed system by supplying this signal to terminals 96. If the energizing signal is of sufficient amplitude, the shock excitation of block 82 will be forced to occur in the proper phase with respect to the applied signal to permit continued vibration of reed 80. The ripple superimposed on the sawtooth voltage may be eliminated by a suitable filter.

Figure 10:
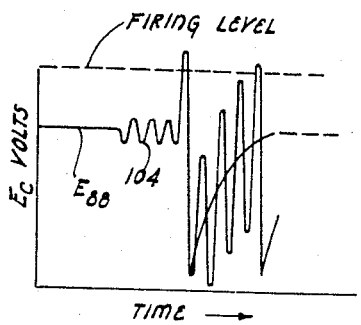
Fig. 10 is a plot of the signals appearing in the system of Fig. 8 when energized as a detector.

The system shown in Fig. 8 may be made to function as a threshold detector by applying the signal to be detected to terminals 96 and lowering the potential supplied by source 88 below the firing potential of tube 92. In the absence of a signal at terminals 96, capacitor 82' will charge to the potential of source 88 which is represented by the line $E_{88}$ in Fig. 10. A signal supplied to reed 96, which lies within the passband of the reed system, will set reed element 80 into vibration and cause an alternating component 104 to be superimposed on the potential across capacitor 82'. The small oscillation 104 is still insufficient to raise the potential across capacitor 82' to the firing level of tube 92. However, if the signal supplied to input terminals 96 increases above a preselected level, the amplitude of the vibration of reed element 80 and the alternating component of potential appearing across capacitor 82' will increase as shown at 106 in Fig. 10, causing tube 92 to fire and discharge capacitor 82'. Capacitor 82' will recharge and tube 92 will again fire provided the input signal is still above the critical level. The time constant of circuit 90—82' will depend upon the use that is to be made of the output signal appearing at terminals 94. A relatively short time constant is represented in Fig. 10. It will be seen that the circuit last described is a narrow band, threshold detector having a relatively large output signal as compared to the input signal.

While there have been described what are at present considered to be the preferred embodiments of the invention and the manner in which the same are to be used, it is recognized that other and further modifications of the invention are possible which fall within the spirit and scope of the hereinafter appended claims.

What is claimed is:

1. A frequency sensitive electromechanical system comprising, a base member, an elongated piezoelectric member secured to said base member in a position such that a substantial portion of the length including a first end region thereof is free of said base member, an elongated high Q, mechanically resonant, reed element, one end region of said reed element being secured substantially directly to said first end region of said piezoelectric member, the second end of said reed element being free to vibrate, the characteristics of said piezoelectric member being such that regions on either side of the longitudinal axis thereof undergo changes in potential as a result of the flexure of said reed element and means for making electrical contact with said regions of said piezoelectric member.

2. A frequency sensitive electromechanical system comprising a base member, an elongated piezoelectric member of substantially rectangular transverse cross-section, a first face of said piezoelectric member being secured to said base member in a cantilever position such that a substantial portion of the length including one end region thereof is free of said base member, an elongated, high Q, reed element disposed with the longitudinal axis thereof substantially parallel to the longitudinal axis of said piezoelectric member, one end region of said reed element being secured substantially directly to said first end region of said piezoelectric member, the second end region of said reed element being free to vibrate, said reed element forming a substantially collinear extension of the cantilever portion of said piezoelectric member the characteristics of said piezoelectric member being such that said face secured to said base member and a second face thereof on the opposite side of the longitudinal axis of said piezoelectric member undergo changes in potential as a result of the flexing of said reed element, and means for making electrical contact with said first and second faces of said piezoelectric member.

3. A frequency sensitive electromechanical system comprising a base member, an elongated piezoelectric member of substantially rectangular transverse cross-section, a first longitudinally-extending face of said piezoelectric member being secured to said base member with one end of said piezoelectric member overhanging said base member in a cantilever position, an elongated reed element disposed with the longitudinal axis thereof substantially parallel to the longitudinal axis of said piezoelectric member, one end region of said reed element being secured to a second longitudinally-extending face of said piezoelectric member in an overlying relationship, said second face lying on the opposite side of said longitudinal axis of said piezoelectric member from said first face, said reed element forming a substantially collinear extension of the cantilever portion of said piezoelectric member, the dimensions of said reed element and said piezoelectric member being so chosen that the neutral axis of flexure of the combination of said reed element and said piezoelectric member in a plane perpendicular to said two faces lies substantially in said second face, conductive area electrodes disposed in contact with said two faces of said piezoelectric member and means for making electrical contact with said electrodes.

4. The frequency sensitive electromechanical system of claim 3, said system further comprising means other than said piezoelectric member for causing said reed element to vibrate.

References Cited in the file of this patent

UNITED STATES PATENTS

| | | |
|---|---|---|
| 1,693,806 | Cady | Dec. 4, 1928 |
| 1,947,049 | Koch | Feb. 13, 1934 |
| 1,958,014 | Nicolson | May 8, 1934 |
| 2,185,966 | Pfanstiehl | Jan. 2, 1940 |
| 2,309,703 | Lovell | Feb. 2, 1943 |
| 2,487,962 | Arndt | Nov. 15, 1949 |
| 2,524,579 | Taylor | Oct. 3, 1950 |
| 2,571,019 | Donley | Oct. 9, 1951 |
| 2,625,663 | Howatt | Jan. 13, 1953 |
| 2,640,165 | Howatt | May 26, 1953 |
| 2,659,829 | Baerwald | Nov. 17, 1953 |
| 2,701,280 | Chamberlain | Feb. 1, 1955 |
| 2,719,929 | Brown | Oct. 4, 1955 |